(12) United States Patent
Liu et al.

(10) Patent No.: US 11,228,071 B2
(45) Date of Patent: Jan. 18, 2022

(54) BATTERY CELL FOR ELECTRIC VEHICLE BATTERY PACK

(71) Applicant: SF Motors, Inc., Santa Clara, CA (US)

(72) Inventors: Ying Liu, Santa Clara, CA (US); Scott Quinlan Freeman Monismith, Santa Clara, CA (US); Chien-Fan Chen, Santa Clara, CA (US); Jeremy Andrew Elsberry, Santa Clara, CA (US); Yifan Tang, Santa Clara, CA (US)

(73) Assignees: CHONGQING JINKANG NEW ENERGY VEHICLE CO., LTD., Chongqing (CN); SF MOTORS, INC., Santa Clara, CA (US)

( * ) Notice: Subject to any disclaimer, the term of this patent is extended or adjusted under 35 U.S.C. 154(b) by 40 days.

(21) Appl. No.: 16/937,941

(22) Filed: Jul. 24, 2020

(65) Prior Publication Data
US 2020/0358062 A1    Nov. 12, 2020

Related U.S. Application Data

(63) Continuation of application No. 16/122,533, filed on Sep. 5, 2018, now Pat. No. 10,734,620.
(Continued)

(51) Int. Cl.
*H01M 2/10* (2006.01)
*H01M 10/52* (2006.01)
*H01M 10/04* (2006.01)
*H01M 2/26* (2006.01)
*B60L 50/50* (2019.01)
(Continued)

(52) U.S. Cl.
CPC ............. *H01M 50/20* (2021.01); *B60L 50/50* (2019.02); *H01M 10/04* (2013.01); *H01M 10/52* (2013.01); *H01M 50/531* (2021.01)

(58) Field of Classification Search
CPC .... H01M 2/1083; H01M 10/52; H01M 10/04; H01M 2/26; B60L 50/50
See application file for complete search history.

(56) References Cited

FOREIGN PATENT DOCUMENTS

| CN | 101237032 A | 8/2008 |
|----|-------------|--------|
| CN | 106329027 A | 1/2017 |

(Continued)

OTHER PUBLICATIONS

International Search Report and Written Opinion of the International Searching Authority on PCT/CN2019/087025 dated Aug. 21, 2019 (9 pages).

(Continued)

*Primary Examiner* — Sarah A. Slifka
(74) *Attorney, Agent, or Firm* — Foley & Lardner LLP; James De Vellis

(57) ABSTRACT

A battery cell of a battery pack to power an electric vehicle can include a housing to at least partially enclose an electrode assembly is provided. The battery cell can include a vent plate coupled with the housing via a glass weld at a lateral end of the battery cell. The vent plate can include a scoring pattern to cause the vent plate to rupture in response to a threshold pressure. A first end of a polymer tab can be electrically coupled with the vent plate at an area within a scored region defined by the scoring pattern. A second end of the polymer tab can be electrically coupled with an electrode assembly. The polymer tab can melt in response to either a threshold temperature or a threshold current within the battery cell.

20 Claims, 10 Drawing Sheets

Related U.S. Application Data

(60) Provisional application No. 62/646,987, filed on Mar. 23, 2018.

(51) Int. Cl.
*H01M 50/20* (2021.01)
*H01M 50/531* (2021.01)

(56) References Cited

FOREIGN PATENT DOCUMENTS

| CN | 106910853 A | 6/2017 |
|---|---|---|
| WO | WO- 2017132575/000000 A1 | 8/2017 |

OTHER PUBLICATIONS

Notice of Allowance on U.S. Appl. No. 16/122,533 dated Mar. 24, 2020 (8 pages).

1000

PROVIDE BATTERY CELL
1005

FIG. 10

BATTERY CELL FOR ELECTRIC VEHICLE BATTERY PACK

CROSS-REFERENCE TO RELATED APPLICATIONS

This application claims priority under 35 U.S.C. § 120 as a continuation of U.S. patent application Ser. No. 16/122,533, filed Sep. 5, 2018, which claims priority under 35 U.S.C. § 119 to U.S. Provisional Patent Application No. 62/646,987, filed Mar. 23, 2018, each of which is incorporated herein by reference in its entirety.

BACKGROUND

Electric vehicles such as automobiles can include onboard battery cells or battery packs to power the electric vehicles. Batteries can experience a condition known as thermal runaway under some operating conditions or environmental conditions.

SUMMARY

At least one aspect of this disclosure is directed to a battery cell of a battery pack to power an electric vehicle. The battery cell can include a housing to at least partially enclose an electrode assembly. The housing can define a side surface of the battery cell. The battery cell can include a first polarity terminal including at least a portion of the housing. The battery cell can include a vent plate coupled with the housing via a glass weld at a lateral end of the battery cell to electrically insulate the vent plate from the housing. The vent plate can include a scoring pattern to cause the vent plate to rupture in response to a threshold pressure within the battery cell. The scoring pattern can define a scored region on the vent plate. The battery cell can include a second polarity terminal including at least a portion of the vent plate. The battery cell can include an electrically conductive polymer tab to electrically connect the electrode assembly to the second polarity terminal. The polymer tab can have a first end and a second end. The first end of the polymer tab can be electrically coupled with the vent plate at an area within the scored region defined by the scoring pattern on the vent plate. The second end of the polymer tab can be electrically coupled with the electrode assembly. The polymer tab can melt in response to either a threshold temperature or a threshold current within the battery cell.

At least one aspect of this disclosure is directed to a method of providing battery cells for battery packs of electric vehicles. The method can include forming a housing for a battery cell of a battery pack having a plurality of battery cells. The housing can define a side surface of the battery cell. The housing can form at least a portion of a first polarity terminal of the battery cell. The method can include providing an electrode assembly within the housing. The method can include etching a scoring pattern into a vent plate to cause the vent plate to rupture when exposed to a pressure exceeding a threshold pressure. the scoring pattern can define a scored region on the vent plate. The vent plate can form at least a portion of a second polarity terminal of the battery cell. The method can include electrically coupling a first end of an electrically conductive polymer tab with the vent plate at an area within the scored region defined by the scoring pattern on the vent plate. The polymer tab can melt when exposed to either a threshold temperature or a threshold current. The method can include electrically coupling a second end of the polymer tab, opposite the first end of the polymer tab, with the electrode assembly. The method can also include coupling the vent plate with housing via a glass weld to form a seal around the electrode assembly and the polymer tab.

At least one aspect of this disclosure is directed to an electric vehicle. The electric vehicle can include a battery pack installed in the electric vehicle. A battery cell can be installed in the battery pack. The battery cell can include a housing to at least partially enclose an electrode assembly. The housing can define a side surface of the battery cell. The battery cell can include a first polarity terminal including at least a portion of the housing. The battery cell can include a vent plate coupled with the housing via a glass weld at a lateral end of the battery cell to electrically insulate the vent plate from the housing. The vent plate can include a scoring pattern to cause the vent plate to rupture in response to a threshold pressure within the battery cell. The scoring pattern can define a scored region on the vent plate. The battery cell can include a second polarity terminal including at least a portion of the vent plate. The battery cell can include an electrically conductive polymer tab to electrically connect the electrode assembly to the second polarity terminal. The polymer tab can have a first end and a second end. The first end of the polymer tab can be electrically coupled with the vent plate at an area within the scored region defined by the scoring pattern on the vent plate. The second end of the polymer tab can be electrically coupled with the electrode assembly. The polymer tab can melt in response to either a threshold temperature or a threshold current within the battery cell.

At least one aspect of this disclosure is directed to a method. The method can include providing a battery cell of a battery pack to power an electric vehicle. The battery cell can include a housing to at least partially enclose an electrode assembly. The housing can define a side surface of the battery cell. The battery cell can include a first polarity terminal including at least a portion of the housing. The battery cell can include a vent plate coupled with the housing via a glass weld at a lateral end of the battery cell to electrically insulate the vent plate from the housing. The vent plate can include a scoring pattern to cause the vent plate to rupture in response to a threshold pressure within the battery cell. The scoring pattern can define a scored region on the vent plate. The battery cell can include a second polarity terminal including at least a portion of the vent plate. The battery cell can include an electrically conductive polymer tab to electrically connect the electrode assembly to the second polarity terminal. The polymer tab can have a first end and a second end. The first end of the polymer tab can be electrically coupled with the vent plate at an area within the scored region defined by the scoring pattern on the vent plate. The second end of the polymer tab can be electrically coupled with the electrode assembly. The polymer tab can melt in response to either a threshold temperature or a threshold current within the battery cell.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 10 depicts a flow chart of an example process of providing a battery cell for a battery pack of an electric vehicle.

Following below are more detailed descriptions of various concepts related to, and implementations of, methods, apparatuses, and systems of battery cells for electric vehicles. The various concepts introduced above and discussed in greater detail below may be implemented in any of numerous ways, as the described concepts are not limited to any particular manner of implementation.

DETAILED DESCRIPTION

Systems and methods described herein relate to battery cells for battery packs (or battery modules) that can provide power to electric vehicles ("EVs"). Battery packs, which can be referred to herein as battery modules, can include battery cells such as lithium ion battery cells. Such battery cells can perform well under normal operating conditions. However, certain abuse or out of tolerance range conditions can lead to the failure of such battery cells. For example, when a battery cell is abused or subject to out of tolerance conditions thermally, electrically, or mechanically, the battery cell has the potential to undergo a condition known as thermal runaway. During thermal runaway, reactions occurring on the surface of an electrode or terminal of the battery can cause heat generation, which in turn can accelerate the rate of the reaction, thereby creating a feedback loop that can result in rapid temperature acceleration of the battery. In some instances, this feedback loop can cause a battery cell failure.

Battery cell designs can incorporate aluminum current collectors bonded to the cathode and anode tabs attached to the electrodes. The cathode or positive tab can bond to the lid assembly. The lid assembly can include some form of current interrupt device (CID), gasket, and insulating polymer. Such assemblies can pose a technical problem, as multiple cell components may be disposed in a crimped area of the battery cell housing, thereby limiting the amount of space for the electrolyte or other active material within the housing. In addition, CID designs may respond to pressure, but may not respond to temperature or electrical stimuli. In extreme thermal events such as thermal runaway, any combination of pressure, temperature, and current can spike precipitously.

Figure 1:
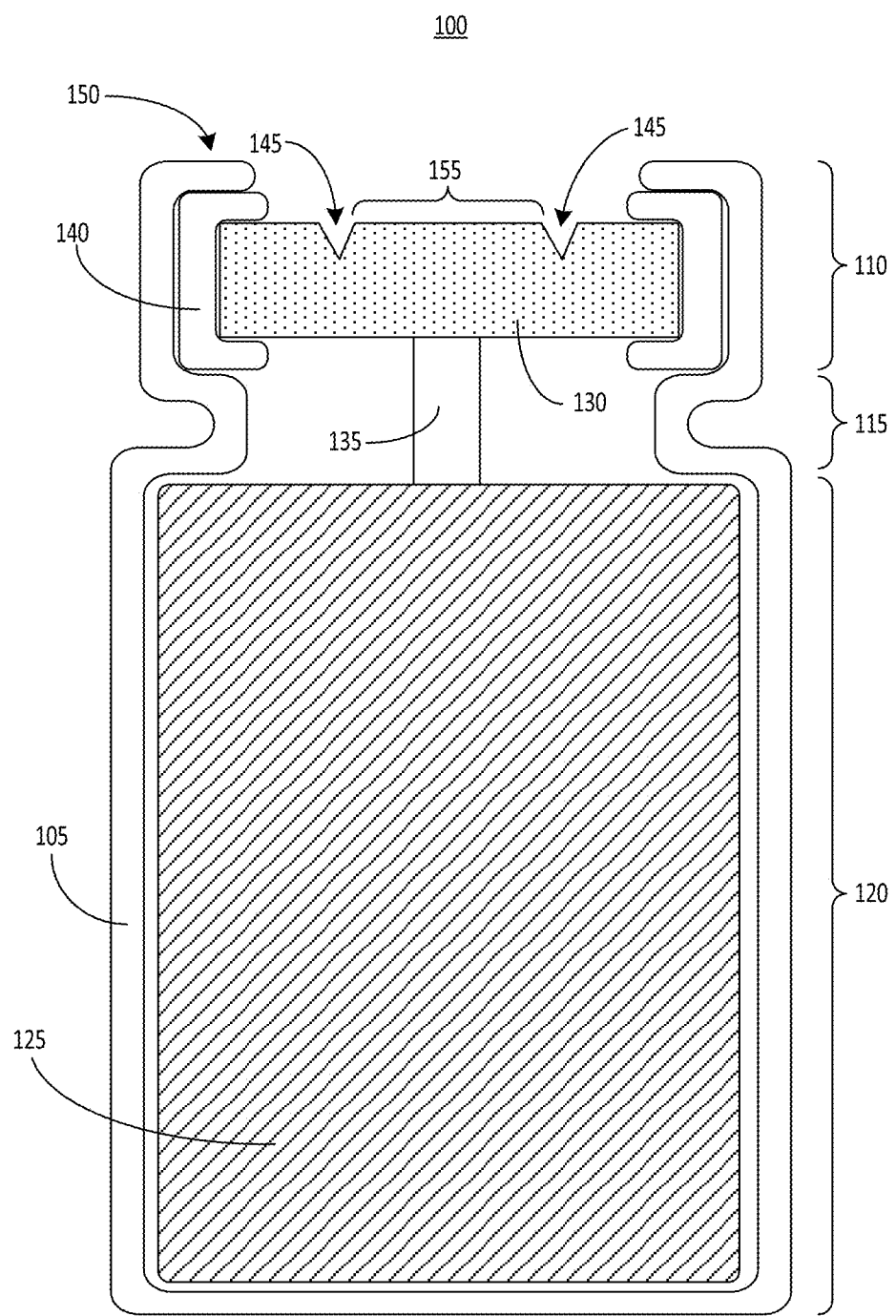
FIG. 1 depicts a cross-sectional view of an example battery cell for an electric vehicle battery pack.

FIG. 1 depicts an example battery cell 100 for an electric vehicle battery pack. The battery cell 100 can includes one housing 105. The housing can include a head region 110, a neck region 115, and a body region 120. The head region 110 can be positioned at a lateral end of the battery cell 100 that is opposite the body region 120. The body region 120 of the housing 105 can contain an electrode assembly 125 (e.g., a "jelly roll" 125) that provides electric power for the battery cell 100. The electrode assembly 125 can be or can include an electrolyte material. For example, an electrolyte material, such as an ionically conductive liquid, can penetrate the electrode assembly 125. At least a portion of the electrode assembly 125 can be electrically connected with a vent plate 130 of the battery cell 100, via at least one connecting element 135. The vent plate 130 can therefore serve as a first polarity terminal of the battery cell 100, and can also be referred to in this disclosure as a first polarity terminal 130. The vent plate 130 can be supported within the head region 110 by the neck region 115 of the housing 105. A gasket 140 can surround the vent plate 130 and can electrically insulate the vent plate 130 from the housing 105. The gasket 140 can be formed from an electrically insulating material, such as a plastic or rubber material. For example, the gasket 140 can be formed from polypropylene.

The housing 105 can be electrically insulated from a portion (e.g., a positively charged portion) of the electrode assembly 125 that is electrically coupled with the vent plate 130 by the connecting element 135. The housing 105 can also be electrically coupled to another portion (e.g., a negatively charged portion) of the electrode assembly 125 to allow the housing 105 to serve as a second polarity terminal of the battery cell 100. For example, the housing 105 can be formed from a conductive metal, such as steel, aluminum, or copper, so that the housing can conduct electrical current from a portion of the electrode assembly 125. The top perimeter edge of the housing 105 can include a lip 150, which can serve as the second polarity terminal and can be electrically coupled to a negative portion of the electrode assembly 125 contained within the housing 105. The lip 150 can also serve as a surface to which a wire can be bonded to carry current from the housing 105 to a busbar or current collector.

Thermal runaway in the battery cell 100 can be preceded by an increase in any combination of gas pressure, temperature, or electric current in the area beneath the vent plate 130 (e.g., a cap) of the battery cell 100. The vent plate 130 can include a current interrupt device (CID) and one or more vents to release gas pressure buildup within the battery cell 100. For example, the vent plate 130 can include one or more scoring patterns 145 that allow the vent plate 130 to respond to an internal pressure in the battery cell 100 by causing the vent plate 130 to break, rupture, tear, or buckle away from the electrode assembly 125 housed within the housing 105 when the pressure reaches or exceeds a pressure threshold, thereby disconnecting or otherwise interrupting the flow of electric current and releasing the pressure. When pressure builds up beyond the pressure threshold, the vent plate 130 can rupture along the scoring pattern 145, allowing gas to escape and relieving the pressure. The threshold pressure that causes the vent plate 130 to rupture along the scoring pattern 145 can be between 60 pounds per square inch (PSI) and 500 PSI.

The scoring pattern 145 can include one or more marks formed on or into a surface of the vent plate 130. For example, the scoring pattern 145 can include one or more troughs, divots, cutouts, holes, grooves, etches, or other patterns that render a thickness of the vent plate 130 at the scoring pattern 145 thinner than a thickness of the unscored portions of the vent plate 130. The scoring pattern 145 can be formed by removing a portion of the material that makes up the vent plate 130, for example by etching, scraping, ablating, vaporizing, or cutting away some of the material of the vent plate 130.

The scoring pattern 145 can be a continuous pattern, such as a groove that is etched into a surface of the vent plate 130 to form a loop on the surface of the vent plate 130. For example, the scoring pattern 145 can be continuous and can enclose, define, or outline a scored region 155 on a surface of the vent plate 130 in the shape of a circle, an oval, a rectangle, or any other curved or polygonal shape. In the example cross-sectional view shown in FIG. 1, the triangular divots representing the scoring pattern 145 in the vent plate 130 can each be positioned on opposite sides of such a loop. The scoring pattern 145 also can be discontinuous. For example, the scoring pattern 145 can include a series of discontinuous troughs, divots, holes, grooves, or cutouts, such as a perforated line, that surrounds the scored region 155 on the surface of the terminal 130. The scored region 155 defined by the scoring pattern 145 can be either a symmetrical pattern or an asymmetrical pattern. Generally, because the vent plate 130 is thinner where the scoring pattern 145 is present than across a remainder (e.g., an unscored portion) of the vent plate 130, the scoring pattern 145 can cause the vent plate 130 to tear or rupture along the scoring pattern 145 in response to a threshold pressure within the battery cell 100. The threshold pressure can be predetermined. For example the vent plate 130 or the scoring pattern 145 can be designed to rupture along at least part of the scoring pattern 145 responsive to pressure in excess of a specified or rated amount. For example, the scoring pattern 145 can be selected to intentionally weaken the vent plate 130 along the scoring pattern 145 so that the vent plate 130 tears or ruptures when the threshold pressure is reached inside the housing 105 (e.g., in the neck region 115). Thus, when the threshold pressure is reached, the vent plate 130 can tear or rupture in a manner that separates the scored region 155 of the vent plate 130 defined by the scoring pattern 145, to become at least partially separated from a remainder of the vent plate 130 (e.g., a portion of the vent plate 130 outside of the scored region 155). As a result, gas that has built up and that causes pressure within at least a portion of the battery cell 100 to meet or surpass the threshold pressure can escape, thereby relieving the pressure within the battery cell 100.

While the scoring pattern 145 on the vent plate 130 can allow the vent plate 130 to respond to pressure increases that may indicate that thermal runaway is imminent or has already begun, the vent plate 130 itself may not directly respond to other stimuli, such as electrical current increases and temperature increases, that can also signal the onset of thermal runaway. The battery cell 100 and its various components described herein can provide solutions that can respond to both of these stimuli (as well as to excessive gas pressure) to mitigate negative consequences that can be caused by thermal events such as thermal runaway in the battery cell 100. For example, the battery cell 100 described herein can incorporate the connecting element 135 to allow the battery cell 100 to also respond to temperature and electrical current at threshold levels to interrupt the flow of current within the battery cell 100 when any one of those threshold levels is reached. The threshold levels for each of these stimuli can be selected based on levels that may indicate that the onset of thermal runaway is imminent or that thermal runaway has already begun.

The connecting element 135 can also be referred to as a tab 135. The tab 135 can electrically couple the electrode assembly 125 with the vent plate 130. The tab 135 can be formed from a conductive material. In some examples, the tab 135 can be formed from a conductive metal or alloy, such as steel, aluminum, or copper. However, such metal materials may have a relatively high melting point, as well as relatively low resistivity. As a result, such a material may not be impacted by high temperatures or high electrical currents that can occur during thermal runaway. A metal tab 135 may therefore continue to conduct electricity from the electrolyte 125 to the vent plate 130 even after any combination of current or temperature levels has reached a threshold value indicative of thermal runaway and out of tolerance for normal operating conditions.

To address this technical challenge, the tab 135 can be formed from a conductive polymer material instead of from a metal or alloy. That is, the tab 135 can be a polymer tab and not a metal tab. The tab 135 can be formed from a polymer material that is conductive, thereby allowing the tab 135 to electrically couple the electrode assembly 125 with the vent plate 130. The polymer material of the tab 135 can also have a low melting point relative to a metal or alloy material, such as steel, aluminum, or copper. The polymer material of the tab 135 can also have a high resistivity relative to that of a metal or alloy. The low melting point and high resistivity of the conductive polymer material selected for the tab 135 can achieve various technical benefits relating to interrupting current in response to a thermal runaway condition, such as a threshold temperature or a threshold current. The tab 135 can have a length in the range of 10 millimeters to 20 millimeters and a width in the range of 10 millimeters to 20 millimeters.

Forming the tab 135 from a conductive polymer material having a low melting point can allow the tab 135 to melt when a temperature inside the battery cell 100 (e.g., a an ambient temperature in the neck region 115 or the head region 110 of the housing 105) reaches the melting temperature of the conductive polymer. In some examples, the polymer material of the tab 135 can be selected to have a melting point at or near a threshold temperature that precedes or coincides with thermal runaway. A threshold temperature associated with thermal runaway can be in the range of 120 degrees C. to 140 degrees C., and the polymer material selected for the tab 135 can be selected to have a melting point in this range. For example, the threshold temperature (and the melting point of the polymer material used to form the tab 135) may be 130 degrees C. Thus, when the threshold temperature is reached, the tab 135 can melt, thereby severing the connection that electrically couples the electrode assembly 125 with the vent plate 130 to stop the flow of electricity in the battery cell 100. In contrast, conductive metals and alloys may have substantially higher melting points, such as 550 degrees C. to 650 degrees C., and may therefore not be able to melt in response to a threshold temperature in the range of 120 degrees C. to 140 degrees C.

The polymer material of the tab 135 can also be selected to have a relatively high resistivity, compared to the resistivity of a metal or alloy. High resistivity can lead to resistive heating when high electrical currents pass through the tab 135. The polymer material of the tab 135 can be selected such that the tab 135 heats to a temperature at or above its melting point when a threshold current passes through the tab 135. Thus, the tab 135 can melt when the threshold current is reached, thereby severing the electrical connection between the electrode assembly 125 and the terminal 130 to interrupt the flow of current in the battery cell 100. The threshold current can be a current that indicates a thermal runaway event is imminent or has already begun. For example, the threshold current that triggers melting of the tab 135 can be in the range of 50 A to 100 A. When the threshold current is reached, the tab 135 can melt. Thus, the tab 135 can act as a fuse to prohibit the flow of current when a threshold current level is reached. In some examples, the polymer material used for the tab 135 can include polyacetylene, polyphenylene vinylene, or polypyrrole. In some examples, the polymer material used for the tab 135 may be a highly crystalline material doped with conductive additives.

Figure 2:
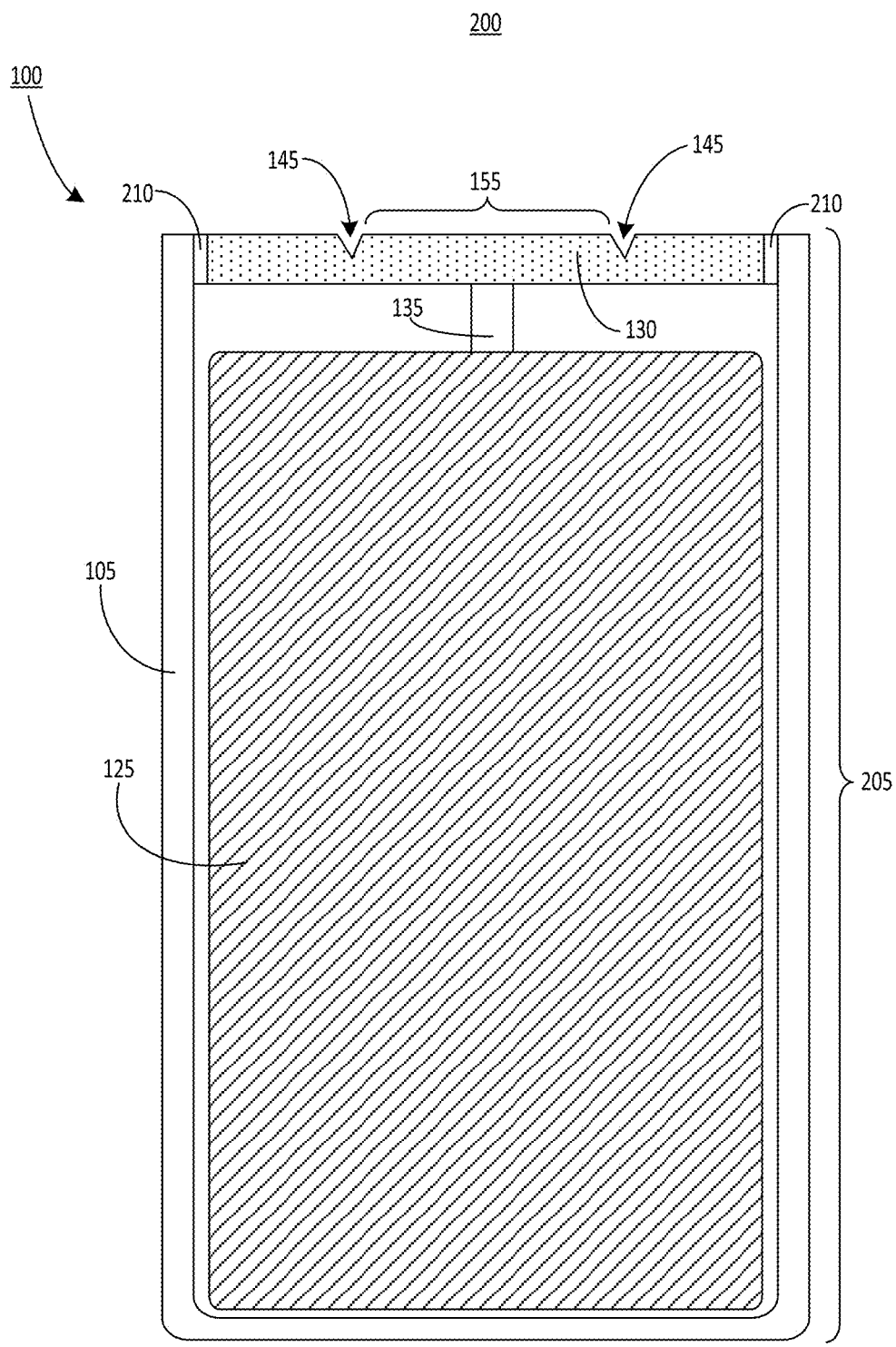
FIG. 2 depicts a cross-sectional view of an example battery cell for an electric vehicle battery pack.

FIG. 2 depicts a cross-sectional view 200 of an example battery cell 100 for an electric vehicle battery pack. The battery cell 100 can include at least one housing 105, which can enclose an electrolyte 125. The battery cell 100 can also include at least one vent plate 130. The vent plate 130 can be electrically coupled with the electrolyte 125 via a tab 135. The vent plate 130 can include a scoring pattern 145 that can enclose or define a scored region 155.

The housing 105 in some examples is not crimped to define any separate body region, neck region, or head region. Instead, the housing 105 includes an uncrimped sidewall 205 (which can also be referred to in this disclosure as a side surface 205). The uncrimped sidewall 205 can extend straight along a lateral direction of the battery cell 100, and is not bent, crimped, deformed, or otherwise shaped in a manner that defines a body region, a neck region, or a head region as shown in FIG. 1. Because there is no neck region or other crimped portion of the housing 105 configured to support the vent plate 130, the vent plate 130 can be supported in a different manner. For example, in FIG. 2, the vent plate 130 can be secured to the housing 105 via a weld 210. The weld 210 can be, for example a glass weld. In other examples, the weld 210 can be a different type of weld. Generally, the weld 210 can secure the vent plate 130 to the housing 105 and to hold the vent plate 130 in position. The weld 210 can also electrically insulate the vent plate 130 from the housing 105. Therefore, the weld 210 can be formed from an insulating material, such as glass.

Because the vent plate 130 is held in place, and electrically insulated from the housing 105 in some examples by the weld 210, the battery cell 100 may not include any gasket. In addition, while the vent plate 130 can include, house, or accommodate a positive temperature coefficient (PTC) polymer to provide thermal protection, the battery cell 100 can include the polymer tab 135 and may not include any additional PTC polymer in the vent plate 130. In this example, the battery cell 100 with the polymer tab 135 and without a PTC polymer positioned in the vent plate can include one less component (as there is no PTC polymer in the vent plate 130) than a design including such a PTC polymer. In examples in which a PTC polymer may be included in the vent plate 130, the resistance of the PTC polymer can increase rapidly as temperature increases, cutting off the current within the battery cell 100.

Because the housing 105 in some examples is not bent or crimped to define any separate body region, neck region, or head region, there can be more space available inside the housing 105 for enclosing the electrode assembly 125. As a result, there can be more electrode assembly 125 housed within the battery cell 100 of FIG. 2 as compared to the amount of electrode assembly 125 housed within the battery cell 100 of FIG. 1, thereby leading to a greater energy density for the battery cell 100 in some examples. For example, the housing 105 of FIG. 1 may initially be formed with a straight sidewall, such that the housing 105 has a cylindrical shape. The cylindrical housing 105 can be bent or deformed through one or more crimping operations to define the head region 110, the neck region 115, and the body region 120. The one or more crimping operations can therefore reduce the overall height of the battery cell 100. This can cause the electrode assembly 125 to be positioned nearer to the vent plate 130 than in a crimped configuration, as no vertical space is required for the neck region that may be present in the crimped configuration. For example, the electrode assembly 125 can be positioned within 0.2 millimeters to 8 millimeters of the vent plate 130 in the example of FIG. 2.

By reducing or eliminating the need for any crimping operations through use of the weld 210, the battery cell 100 can have an increased height (and therefore an increased volume for housing the electrode assembly 125) relative to a crimped battery cell 100. In some examples, the height of the battery cell 100 of FIG. 2 (e.g., the length of the sidewall 205) can be between 65 millimeters and 75 millimeters. By bypassing the crimping operation, the length in the housing 105 available to the electrode assembly 125 can increase from, for example, 65 mm to 67 mm. Other shapes, sizes, and dimensions are possible for the battery cell 100 and for the electrode assembly 125 housed therein. The housing 105 can have a diameter between 24 millimeters and 28 millimeters. The housing 105 can also have a diameter in the range of 19 millimeters to 23 millimeters. The vent plate 130 can have a diameter less than that of the housing 105 to allow the vent plate 130 to fit into the housing 105 and to be secured to the housing 105 via the weld 210.

Figure 3:
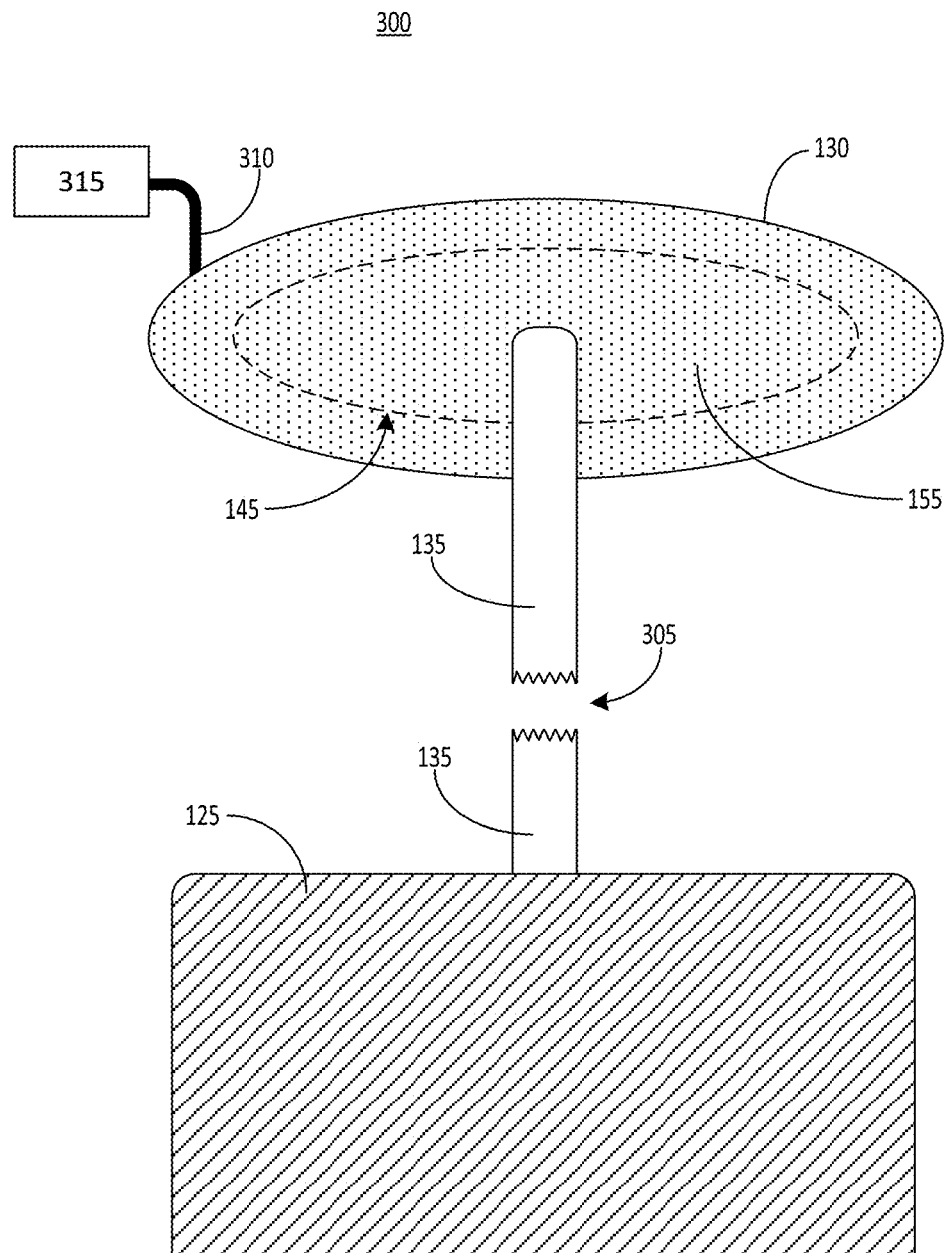
FIG. 3 depicts an example vent plate and polymer tab for a battery cell.

FIG. 3 depicts a perspective view 300 of an example vent plate 130 and polymer tab 135 for a battery cell. Also shown is the electrode assembly 125. FIG. 3 shows the vent plate 130 and the tab 135 in a configuration that can result from any combination of a threshold temperature or a threshold current being reached. As depicted, such a condition can cause the tab 135 to become severed at the area labeled 305, thereby electrically disconnecting the electrode assembly 125 from the vent plate 130. A wire 310 can couple the vent plate 130 to a current collector 315, which can also be referred to as a busbar 315.

The tab 135 has a first end coupled to the vent plate 130, and a second end coupled to the electrode assembly 125. Generally, the tab 135 can be coupled, joined, or otherwise fastened to the vent plate 130 and the electrode assembly 125 in any manner that allows the tab 135 to form an electrical connection with each of the vent plate 130 and the tab 135. For example, the tab 135 can be coupled to the vent plate 130 or the electrode assembly 125 via an electrically conductive adhesive or one or more electrically conductive mechanical fasteners. The tab 135 can also be coupled to the vent plate 130 or the electrode assembly 125 via a press fit or friction fit.

When a high temperature (e.g., a temperature meeting or exceeding a melting point of the tab 135) is experienced, the tab 135 can at least partially melt, open, or tear until it becomes severed at the point 305. The position of the point 305 along the length of the tab 135 is an example. Melting of the tab 135 in response to the threshold temperature can cause the tab 135 to become severed at any point along its length, or at multiple points along its length, such that the electrical connection initially formed between the electrode assembly 125 and the vent plate 130 is broken. As a result, electrical current will no longer flow via the tab 135 between the electrode assembly 125 and the vent plate 130. Therefore, current can no longer be delivered from the electrode assembly 125 to the current collector 315 via the wire 310. The melting point of the tab 135 can be selected to coincide with or be close to (e.g., 1-40% less than) a threshold temperature that indicates a thermal runaway condition. In some examples, the material selected for the tab 135 can be a polymer material having such a melting point, which may be lower than the melting point of conductive metals or alloys. For example, the melting point of the polymer material selected for the tab 135 can be in the range of 120 degrees C. to 140 degrees C.

When a threshold current (e.g., an electrical current passing through the tab 135) is reached, the tab 135 may similarly melt until it becomes severed at the point 305. For example, high current can cause the temperature of the tab 135 to increase due to resistive heating. The material selected for the tab 135 can be a polymer material selected to heat to at least its melting point in response to the threshold current. As a result, the tab 135 can melt when the threshold current is reached, thereby interrupting or cutting off the flow of electrical current between the vent plate 130 and the electrode assembly 125. Therefore, current can no longer be delivered from the electrode assembly 125 to the current collector 315 via the wire 310. The position of the point 305 along the length of the tab 135 is only one example. In some other examples, melting of the tab 135 in response to the threshold current can cause the tab 135 to become severed at any point along its length, or at multiple points along its length, such that the electrical connection initially formed between the electrode assembly 125 and the vent plate 130 is broken.

Figure 4:
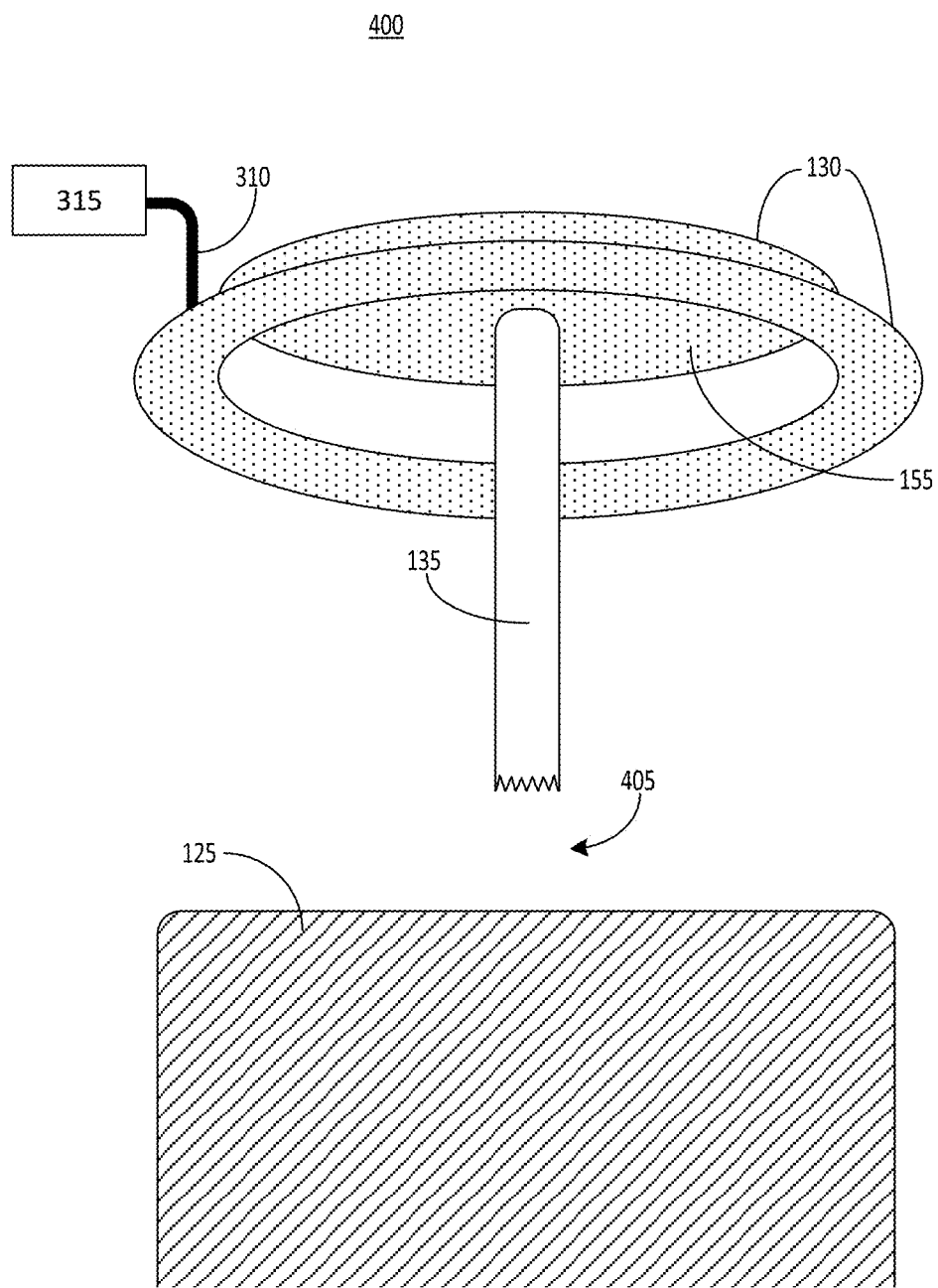
FIG. 4 depicts an example vent plate and polymer tab for a battery cell.

FIG. 4 depicts a perspective view 400 of an example vent plate 130 and polymer tab 135 for a battery cell. For illustrative purposes, other components of the battery cell 100 are not depicted in FIG. 4. FIG. 4 shows the vent plate 130 and the tab 135 in a configuration that can result from a threshold pressure being reached. As depicted, such a condition can cause the scored region 155 of the vent plate 130 to become severed from a remainder (e.g., an unscored portion) of the vent plate 130, thereby electrically disconnecting the electrode assembly 125 from the remainder of the vent plate 130.

The tab 135 has a first end coupled to the vent plate 130, and a second end coupled to the electrode assembly 125. In some examples, the tab 135 can be coupled to the vent plate 130 at any point within the scored region 155. The scored region 155 is shown as being generally circular in shape, however other shapes are also possible. The wire 310 can be coupled to the vent plate 130 at any point outside of the scored region 155. A second end of the tab 135 can be coupled to the electrode assembly 125.

As pressure increases, stresses can accumulate in the vent plate 130. Due to the scoring pattern 145 formed on the surface of the vent plate 130, the vent plate 130 can rupture or tear along the scoring pattern 145 when a threshold pressure is reached. As a result, the scored region 155 of the vent plate 130 can become separated from a remainder of the vent plate 130, as depicted in FIG. 4. For example, the threshold pressure can cause the scored region 155 of the vent plate 130 to be forced up and away from a remainder of the vent plate 130, because the remainder of the vent plate 130 can be secured in place by either the crimping of a neck region 115 of the housing 105, as depicted in FIG. 1, or by a weld 210 that secures the remainder of the vent plate 130 to the housing 105, as depicted in FIG. 2. When the scored region 155 of the vent plate 130 is forced away from the remainder of the vent plate 130, the tab 135 can become severed or torn at the point labeled 405. FIG. 4 depicts the point 405 as being near the electrode assembly 125, however other locations are possible. For example, the tab 135 can instead become severed or torn at a point nearer to the vent plate 130, or at multiple points along the length of the tab 135.

In some examples, the tab 135 may instead remain intact even after the scored region 155 of the vent plate 130 becomes separated from the remainder of the vent plate 130. However, even if the tab 135 remains intact, electrical current can still be interrupted. For example, by securing the tab 135 to the vent plate 130 at a point within the scored region 155 of the vent plate 130, and securing the wire 310 to the vent plate 130 at a point outside of the scored region 155, an electrical connection between the wire 310 and the electrode assembly 125 is severed when the scored region 155 of the vent plate 130 tears, ruptures, or otherwise becomes separated from the remainder of the vent plate 130. Thus, even in examples in which the tab 135 may remain intact, the threshold pressure can still cause the vent plate 130 to tear in a manner that prevents electrical current from being delivered to the current collector 315.

Figure 5:
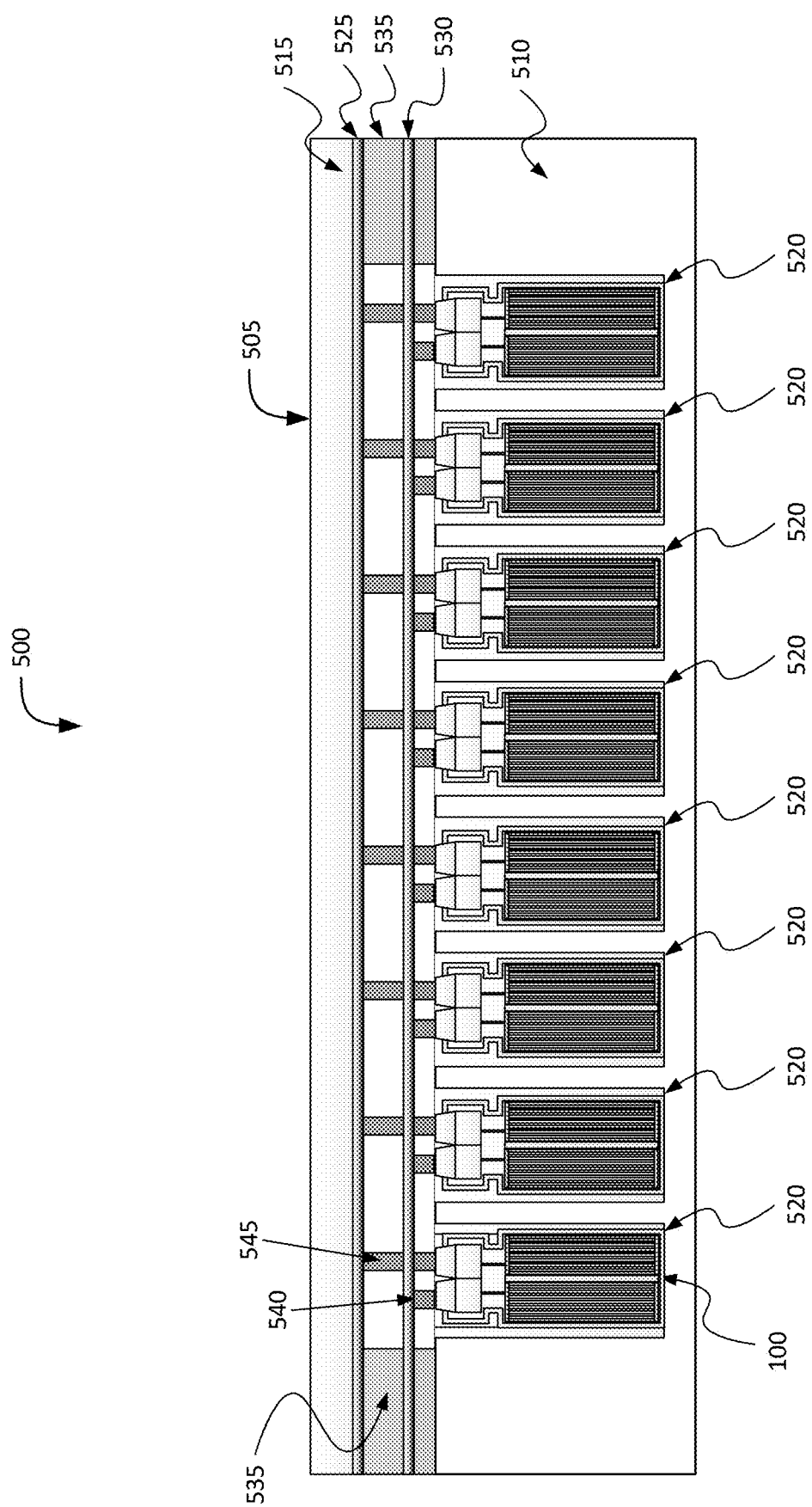
FIG. 5 depicts a cross-sectional view of an example battery pack for holding battery cells in an electric vehicle.

FIG. 5 depicts a cross-section view 500 of a battery pack 505 to hold a plurality of battery cells 100 in an electric vehicle. The battery pack 505 can include a battery module case 510 and a capping element 515. The battery module case 510 can be separated from the capping element 515. The battery module case 510 can include or define a plurality of holders 520. Each holder 520 can include a hollowing or a hollow portion defined by the battery module case 510. Each holder 520 can house, contain, store, or hold a battery cell 100. The battery module case 510 can include at least one electrically or thermally conductive material, or combinations thereof. The battery module case 510 can include one or more thermoelectric heat pumps. Each thermoelectric heat pump can be thermally coupled directly or indirectly to a battery cell 100 housed in the holder 520. Each thermoelectric heat pump can regulate temperature or heat radiating from the battery cell 100 housed in the holder 520. Bonding elements 550 and 555, which can each be electrically coupled with a respective terminal (e.g., a portion of the housing 105 or the vent plate 130) of the battery cell 100, can extend from the battery cell 100 through the respective holder 520 of the battery module case 510.

Between the battery module case 510 and the capping element 515, the battery pack 505 can include a first busbar 525, a second busbar 530, and an electrically insulating layer 535. The first busbar 525 and the second busbar 530 can each include an electrically conductive material to provide electrical power to other electrical components in the electric vehicle. The first busbar 525 (sometimes referred to as a first current collector) can be connected or otherwise electrically coupled with the first bonding element 550 extending from each battery cell 100 housed in the plurality of holders 520 via a bonding element 545. The bonding element 545 can be bonded, welded, connected, attached, or otherwise electrically coupled with the bonding element 550. For example, the bonding element 545 can be welded onto a top surface of the bonding element 550. The second busbar 530 (sometimes referred to as a second current collector) can be connected or otherwise electrically coupled with the second bonding element 555 extending from each battery cell 100 housed in the plurality of holders 520 via a bonding element 540. The bonding element 540 can be bonded, welded, connected, attached, or otherwise electrically coupled with the second bonding element 555. For example, the bonding element 540 can be welded onto a top surface of the second bonding element 555. The second busbar 530 can define the second polarity terminal for the battery pack 505. Each the busbar 525 or the busbar 530 may serve as a current collector similar to the current collector 315.

The first busbar 525 and the second busbar 530 can be separated from each other by the electrically insulating layer 535. The electrically insulating layer 535 can include spacing to pass or fit the first bonding element 550 connected to the first busbar 525 and the second bonding element 555 connected to the second busbar 530. The electrically insulating layer 535 can partially or fully span the volume defined by the battery module case 510 and the capping element 515. A top plane of the electrically insulating layer 535 can be in contact or be flush with a bottom plane of the capping element 515. A bottom plane of the electrically insulating layer 535 can be in contact or be flush with a top plane of the battery module case 510. The electrically insulating layer 535 can include any electrically insulating material or dielectric material, such as air, nitrogen, sulfur hexafluoride ($SF_6$), porcelain, glass, and plastic (e.g., polysiloxane), among others to separate the first busbar 525 from the second busbar 530.

Figure 6:
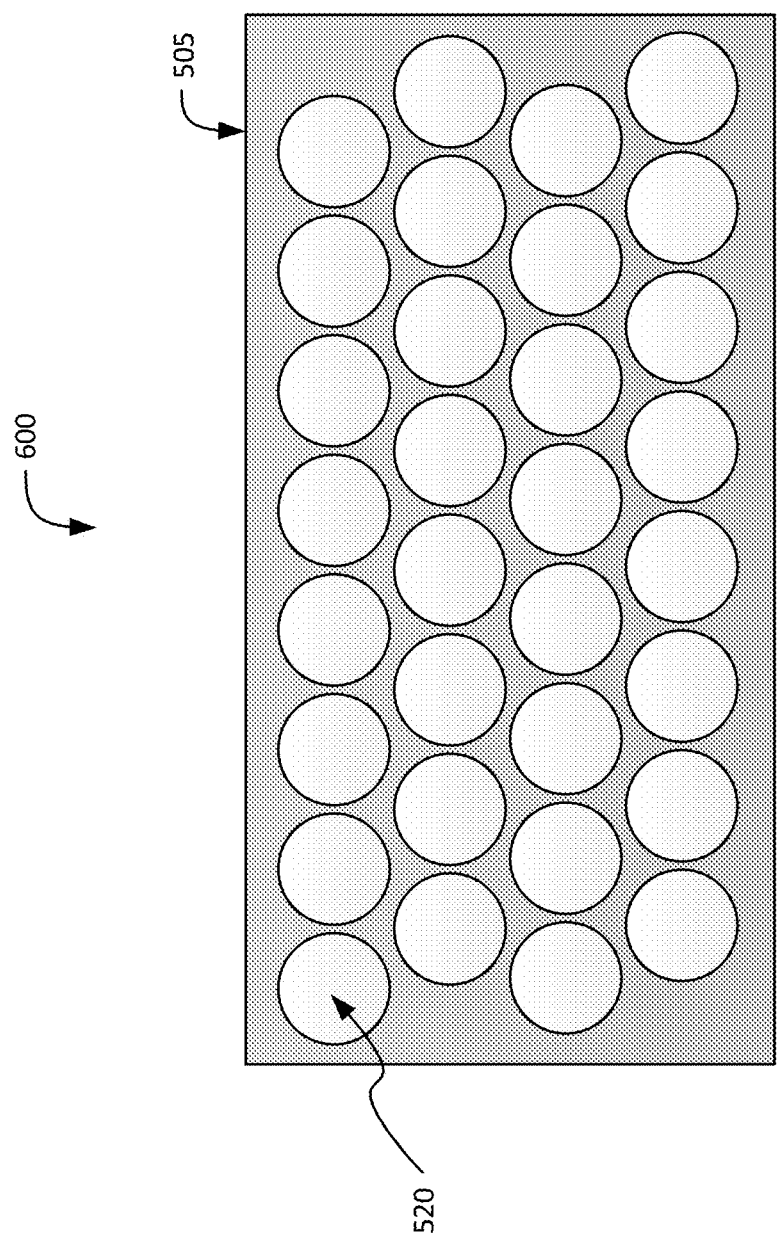
FIG. 6 depicts a top-down view of an example battery pack for holding for battery cells in an electric vehicle.

FIG. 6 depicts is a top-down view 600 of a battery pack 505 to hold a plurality of battery cells 100 in an electric vehicle. The battery pack 505 can define or include a plurality of holders 520. The shape of each holder 520 can be triangular, rectangular, pentagonal, elliptical, and circular, among others. The shapes of each holder 520 can vary or can be uniform throughout the battery pack 505. For example, some holders 520 can be hexagonal in shape, whereas other holders can be circular in shape. The shape of the holder 520 can match the shape of a housing of each battery cell 100 contained therein. The dimensions of each holder 520 can be larger than the dimensions of the battery cell 100 housed therein.

Figure 7:
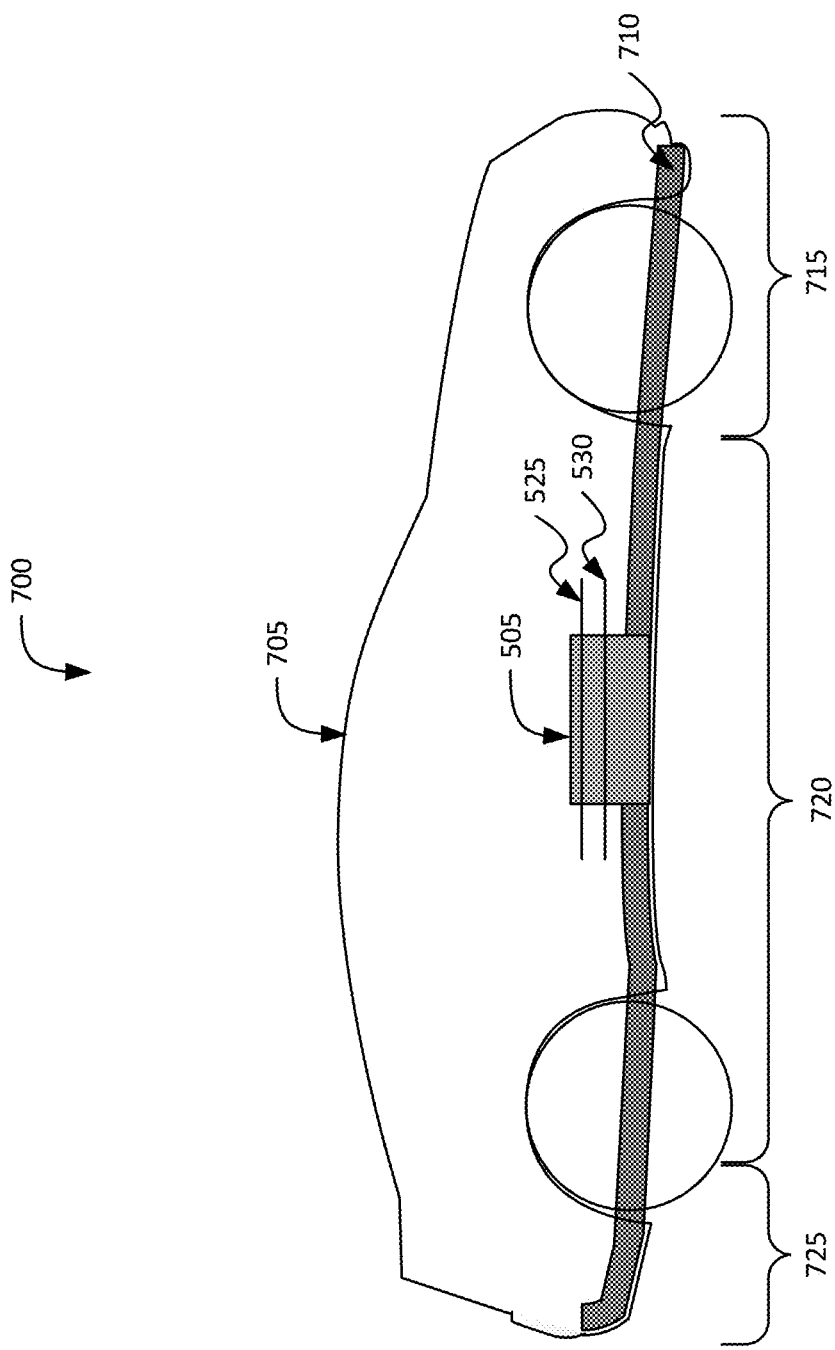
FIG. 7 depicts a cross-sectional view of an example electric vehicle installed with a battery pack.

FIG. 7 depicts is a cross-section view 700 of an electric vehicle 705 installed with a battery pack 505. The electric vehicle 705 can include a chassis 710 (e.g., a frame, internal frame, or support structure). The chassis 710 can support various components of the electric vehicle 705. The chassis 710 can span a front portion 715 (e.g., a hood or bonnet portion), a body portion 720, and a rear portion 725 (e.g., a trunk portion) of the electric vehicle 705. The battery pack 505 can be installed or placed within the electric vehicle 705. The battery pack 505 can be installed on the chassis 710 of the electric vehicle 705 within the front portion 715, the body portion 720 (as depicted in FIG. 7), or the rear portion 725. The first busbar 525 and the second busbar 530 can be connected or otherwise be electrically coupled with other electrical components of the electric vehicle 705 to provide electrical power. The battery cells 100 can each include a vent plate 130 and a polymer tab 135 in order to respond to any combination of a threshold pressure, a threshold temperature, and a threshold current in the manner described above.

Figure 8:
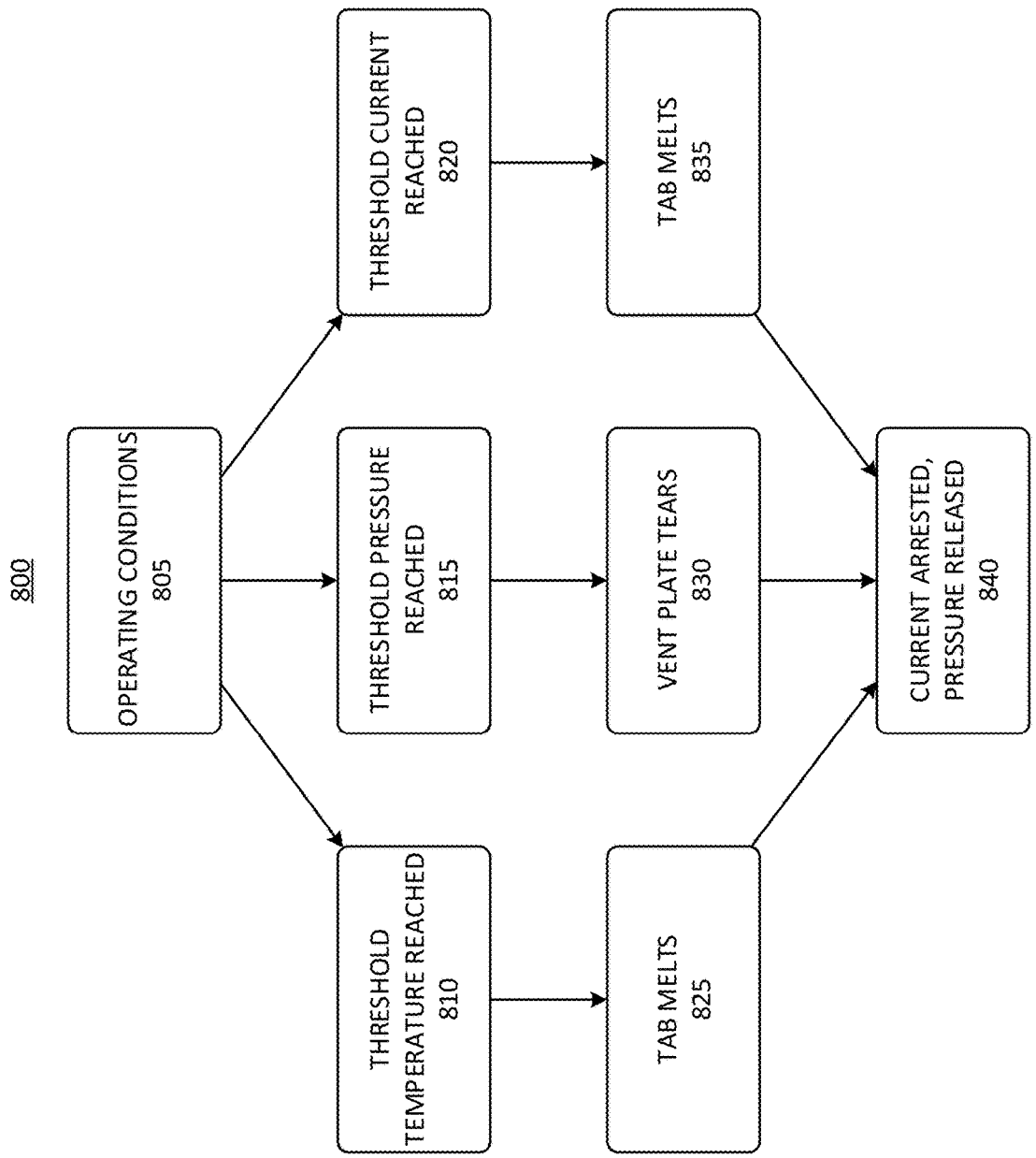
FIG. 8 depicts a flow chart of an example process undergone by a battery experiencing various conditions associated with thermal runaway.

FIG. 8 depicts an example process 800 of battery cells 100 operations for battery packs of electric vehicles. The battery cells 100 can include the vent plate 130 and the tab 135 that can respond to threshold conditions of pressure, temperature, and current, each of which may be indicative of an imminent or ongoing thermal runaway condition for the battery cell 100. The process 800 depicts example conditions associated with thermal runaway. The process 800 begins at block 805, in which the battery cell 100 is operating, for example under normal conditions. In the event of a threshold temperature being reached within the battery cell 100, the process 800 can proceed to block 810. The threshold temperature can be any temperature known to indicate the onset of a thermal runaway event for the battery cell 100. The process 800 can proceed to block 825, in which the tab 135 melts in response to the threshold temperature being reached. For example, the vent plate 130 can be formed from a polymer material having a melting point that corresponds to the threshold temperature reached in block 810. Because the tab 135 forms part of the current path from the electrode assembly 125 to the vent plate 130, which can serve as a first polarity terminal of the battery cell 100, melting of the tab 135 interrupts the current path and arrests this current, as indicated in block 840 of the process 800.

Referring again to block 805, when a threshold pressure is reached in the battery cell 100, the process 800 can proceed to block 815. The threshold pressure can be any pressure that indicates the onset of a thermal runaway event for the battery cell 100. The process 800 can proceed to block 830, in which the vent plate 130 tears or ruptures. For example, the vent plate 130 can include a scoring pattern 145 surrounding a scored region 155 and designed to cause the vent plate 130 to rupture along the scoring pattern 145 when the threshold pressure is reached. This tearing or rupturing can cause the scored region 155 of the vent plate 130 to become separated from a remainder of the vent plate 130. As a result, the current path in the battery cell 100 can be broken.

Again referring to block 805, when a threshold current is reached in the battery cell 100, the process 800 can proceed to block 820. The threshold current can be any current that indicates the onset of a thermal runaway event for the battery cell 100. The process 800 can proceed to block 835, in which the tab 135 melts. For example, the high current can heat the tab 135 rapidly through resistive heating effects, eventually exceeding its melting temperature. The tab 135 can therefore melt in response to the high current, serving as a fuse to interrupt the current path through the battery cell 100. As a result, the current can be interrupted, as indicated in block 840 of the process 800.

Figure 9:
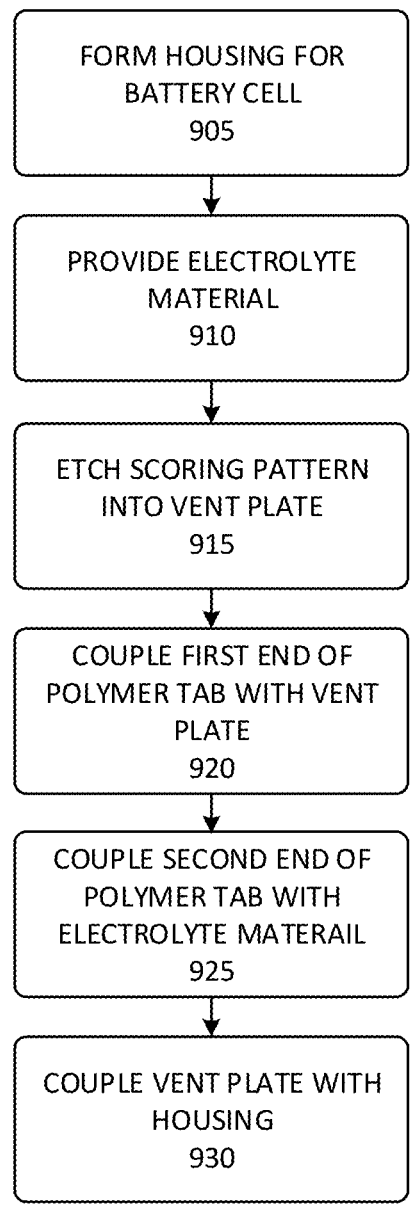
FIG. 9 depicts a flow chart of an example process for manufacturing a battery cell for a battery pack of an electric vehicle.

FIG. 9 depicts a flow chart of an example process 900 for manufacturing a battery cell 100 for a battery pack of an electric vehicle. The method 900 can include forming a housing 105 for the battery cell 100 (ACT 905). The housing 105 can define a sidewall 205 or side surface 205 of the battery cell 100. The housing 105 can form at least a portion of a first polarity terminal of the battery cell 100. In some examples, the housing 105 can be cylindrical in shape, and the side surface 205 may not include any crimped region. For example, the sidewall 205 can extend straight between opposing ends of the housing 105, and may not be bent, deformed, or crimped to define any separate head, neck, or body portions of the housing 105. The method 900 can also include providing an electrode assembly 125 within the housing 105 (ACT 910). The electrode assembly 125 can include any electrically active material capable of supplying electric power for the battery cell 100.

The method 900 can include etching a scoring pattern 145 into a vent plate 130 (ACT 915). The scoring pattern 145 can be any type of pattern configured or selected to cause the vent plate 130 to rupture when exposed to a pressure that exceeds a predetermined or other threshold pressure. For example, the scoring pattern 145 can intentionally weaken a portion of the vent plate 130. The etching of the scoring pattern can be achieved by any suitable means, such as by using a mechanical cutting tool (e.g., a blade) or a laser to etch, ablate, or otherwise remove a portion of the material on a surface of the vent plate 130 to define the scoring pattern 145. The scoring pattern 145 can define or enclose a scored region 155 on the vent plate 130. The vent plate 130 can form at least a portion of a second polarity terminal of the battery cell 100.

The method 900 can include electrically coupling a first end of an electrically conductive polymer tab 135 with the vent plate 130 (ACT 920). The tab 135 can be coupled with the vent plate 130 at an area within the scored region 155 defined by the scoring pattern 145 on the vent plate 130. The polymer tab 135 can be coupled to the vent plate 130, for example, by an electrically conductive adhesive, an electrically conductive mechanical fastener, or by a press fit or friction fit. The polymer tab 135 can be formed from a material selected to melt when exposed to either a threshold temperature or a threshold current. The threshold temperature or current can be predetermined. For example the polymer tab 135 can be designed to melt, tear, or open responsive to temperature or current in applied to the polymer tab 135 exceeding a specified or rated amount. For example, the material selected for the polymer tab 135 can have a melting point at or near the threshold temperature. The material selected for the polymer tab 135 can also have a resistivity that causes the tab 135 to heat to a temperature at or above its melting point in response to the threshold current. In some examples, the threshold temperature can be in the range of 120 degrees C. to 140 degrees C., and the threshold current can be in the range of 50 A to 100 A.

The method 900 can include electrically coupling a second end of the polymer tab 135, opposite the first end of the polymer tab 135, with the electrode assembly 125 (ACT 925). The polymer tab 135 can be coupled to the electrode assembly 125, for example, by an electrically conductive adhesive, an electrically conductive mechanical fastener, or by a press fit or friction fit. The method 900 can also include coupling the vent plate 130 with housing 105 (ACT 930). The vent plate 130 can be coupled with the housing 105, for example, via a glass weld 210. The glass weld 210 can secure the vent plate 130 to the housing 105. The glass weld 210 can also electrically insulate the vent plate 130 from the housing 105, and can form a seal around the electrode assembly 125 and the polymer tab 135. In some examples, using the glass weld 210 to secure the vent plate 130 to the housing 105 may dispense with any need for using a gasket to electrically insulate the vent plate 130 from the housing 105, and may also dispense with any need to form a crimped area in the housing 105 to support the vent plate 130. Thus, in some examples, the method 900 may not include positioning a gasket in the housing 105. The method 900 also may not include performing a crimping operation on the housing 105.

Figure 10:
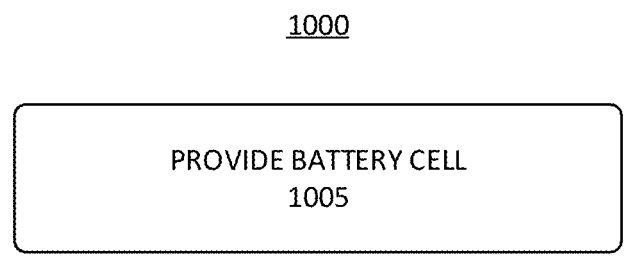

FIG. 10 depicts a flow chart of an example process 1000. The process 1000 can include providing a battery cell 100 (ACT 1005). The battery cell 100 can be a battery cell 100 for an electric vehicle battery pack. The battery cell 100 can include a housing 105 to at least partially enclose an electrode assembly 125. The housing 105 can define a side surface of the battery cell 100. The battery cell 100 can include a first polarity terminal including at least a portion of the housing 105. The battery cell can include a vent plate 130 coupled with the housing 105 via a glass weld 210 at a lateral end of the battery cell 100 to electrically insulate the vent plate 130 from the housing 105. The vent plate 130 can include a scoring pattern 145 to cause the vent plate 130 to rupture in response to a threshold pressure within the battery cell 100. The scoring pattern 145 can define a scored region 155 on the vent plate 130. The battery cell 100 can include a second polarity terminal including at least a portion of the vent plate 130. The battery cell 100 can include an electrically conductive polymer tab 135 to electrically connect the electrode assembly 125 to the second polarity terminal. The polymer tab 135 can have a first end and a second end. The first end of the polymer tab 135 can be electrically coupled with the vent plate 130 at an area within the scored region 155 defined by the scoring pattern 145 on the vent plate 130. The second end of the polymer tab 135 can be electrically coupled with the electrode assembly 125. The polymer tab 135 can melt in response to either a threshold temperature or a threshold current within the battery cell 100.

The solution described in this disclosure provides multiple technical advantages. For example, while battery cell designs having aluminum cathode and anode tabs may have a higher melting point (e.g., 600C) than the polymer tab 135. The lower melting point relative to an aluminum tab or other metal or alloy tab provides tab-based protection against excessive temperature and also a higher resistivity than aluminum or other metals, which can allow the polymer tab 135 to act as a fuse. In addition to this advantage, the lack of a crimp and the user of a glass welding technique can offer space advantages so that a larger volume of electrode assembly 125 can be stored within the battery cell 100.

The crimp-free design with glass welding 210 to the vent plate 130 and the use of the polymer tab 135 can better protect against threshold currents and threshold temperatures associated with thermal runaway, relative to designs that incorporate a crimp, use an aluminum tab, or that forego glass welding between the vent plate 130 and the housing 105.

Having now described some illustrative implementations, it is apparent that the foregoing is illustrative and not limiting, having been presented by way of example. Features that are described herein in the context of separate implementations can also be implemented in combination in a single embodiment or implementation. Features that are described in the context of a single implementation can also be implemented in multiple implementations separately or in various sub-combinations. References to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any act or element may include implementations where the act or element is based at least in part on any act or element.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. For example, descriptions of positive and negative electrical characteristics may be reversed. For example, elements described as negative elements can instead be configured as positive elements and elements described as positive elements can instead by configured as negative elements. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A battery cell of a battery pack to power an electric vehicle, comprising:
   a housing to at least partially enclose an electrode assembly;
   a first polarity terminal;
   a vent plate coupled with the housing at an end of the battery cell to electrically insulate the vent plate from the housing, the vent plate including a scored region;
   a second polarity terminal comprising at least a portion of the vent plate; and
   a polymer tab to electrically connect the electrode assembly to the second polarity terminal, the polymer tab having a first end and a second end, the first end of the polymer tab electrically coupled with the vent plate via the scored region, the second end of the polymer tab electrically coupled with the electrode assembly,
   the scored region to at least partially rupture in response to a pressure within the battery cell being greater than or equal to a threshold pressure, and
   the polymer tab to melt in response to at least one of a temperature within the battery cell being greater than or equal to a threshold temperature or a current within the battery cell being greater than or equal to a threshold current.

2. The battery cell of claim 1, comprising:
   a weld to couple the vent plate to the housing at the end of the battery cell.

3. The battery cell of claim 1, comprising:
   a glass weld to couple the vent plate to the housing at a lateral end of the battery cell.

4. The battery cell of claim 1, comprising:
   a scoring pattern on the vent plate that defines the scored region, the scoring pattern to cause the scored region on the vent plate to rupture in response to the pressure within the battery cell being greater than or equal to the threshold pressure.

5. The battery cell of claim 1, wherein the threshold temperature is in a range of 120 degrees Celsius to 140 degrees Celsius.

6. The battery cell of claim 1, wherein the threshold current is in a range of 50 A to 100 A.

7. The battery cell of claim 1, wherein the threshold pressure is in a range of 60 PSI to 500 PSI.

8. The battery cell of claim 1, comprising:
   a weld to form a seal to separate the electrode assembly from an external environment outside of the battery cell.

9. The battery cell of claim 1, comprising:
   a perforated line that surrounds the scored region on the vent plate.

10. The battery cell of claim 1, comprising:
    a continuous line that forms a loop surrounding the scored region on the vent plate.

11. An electric vehicle, comprising:
    a battery pack installed in the electric vehicle; and
    a battery cell in the battery pack, comprising:
      a housing to at least partially enclose an electrode assembly;
      a first polarity terminal;
      a vent plate coupled with the housing at an end of the battery cell to electrically insulate the vent plate from the housing, the vent plate including a scored region;
      a second polarity terminal comprising at least a portion of the vent plate; and
      a polymer tab to electrically connect the electrode assembly to the second polarity terminal, the polymer tab having a first end and a second end, the first end of the polymer tab electrically coupled with the vent plate via the scored region, the second end of the polymer tab electrically coupled with the electrode assembly,
      the scored region to at least partially rupture in response to a pressure within the battery cell being greater than or equal to a threshold pressure, and
      the polymer tab to melt in response to at least one of a temperature within the battery cell being greater than or equal to a threshold temperature or a current within the battery cell being greater than or equal to a threshold current.

12. The electric vehicle of claim 11, wherein the battery cell comprises:
    a weld to couple the vent plate to the housing at the end of the battery cell.

13. The electric vehicle of claim 11, wherein the battery cell comprises:
    a glass weld to couple the vent plate to the housing at a lateral end of the battery cell.

14. The electric vehicle of claim 11, wherein the battery cell comprises:
    a scoring pattern on the vent plate that defines the scored region, the scoring pattern to cause the scored region on the vent plate to rupture in response to the pressure within the battery cell being greater than or equal to the threshold pressure.

15. The electric vehicle of claim 11, wherein:
    the threshold temperature is in a range of 120 degrees Celsius to 140 degrees Celsius,
    the threshold current is in a range of 50 A to 100 A, and
    the threshold pressure is in a range of 60 PSI to 500 PSI.

16. The electric vehicle of claim 11, wherein the battery cell comprises:
    a weld to form a seal to separate the electrode assembly from an external environment outside of the battery cell.

17. The electric vehicle of claim 11, wherein the battery cell comprises:
    a perforated line that surrounds the scored region on the vent plate.

18. The electric vehicle of claim 11, wherein the battery cell comprises:
  a continuous line that forms a loop surrounding the scored region on the vent plate.

19. A method of providing battery cells for battery packs of electric vehicles, comprising:
  forming a housing for a battery cell of a battery pack having a plurality of battery cells, the housing at least partially enclosing an electrode assembly;
  providing a scored region on a vent plate to cause the vent plate to rupture when exposed to a pressure exceeding a threshold pressure, the vent plate coupled with the housing at an end of the battery cell to electrically insulate the vent plate from the housing;
  providing a second polarity terminal comprising at least a portion of the vent plate; and
  providing a polymer tab that electrically connects the electrode assembly to the second polarity terminal, the polymer tab having a first end and a second end, the first end of the polymer tab electrically coupled with the vent plate via the scored region, the second end of the polymer tab electrically coupled with the electrode assembly,
  wherein the polymer tab melts in response to at least one of a temperature within the battery cell being greater than or equal to a threshold temperature or a current within the battery cell being greater than or equal to a threshold current.

20. The method of claim 19, comprising:
  coupling, via a weld, the vent plate to the housing at the end of the battery cell.

* * * * *